United States Patent
Hehl

[15] 3,664,212
[45] May 23, 1972

[54] ATTACHMENT FOR INJECTION-MOLDING MACHINES

[72] Inventor: Karl Hehl, Siedlung 183, 7291 Lossurg, Wuttenberg, Germany

[22] Filed: Dec. 8, 1970

[21] Appl. No.: 96,215

[30] Foreign Application Priority Data

Dec. 13, 1969 Germany............P 19 62 663.2

[52] U.S. Cl...............................81/52.5, 18/2 RS, 18/45 R, 81/57.14, 81/57.22, 249/59, 249/63
[51] Int. Cl. ....................B25b, B25b 17/00, B25b 21/00
[58] Field of Search ..................81/52.5, 52.4, 57.13, 57.14, 81/57.22; 192/142; 249/63, 59; 18/2 RS, 45 R

[56] References Cited

UNITED STATES PATENTS

| | | | |
|---|---|---|---|
| 3,454,111 | 7/1969 | Niess | 81/52.4 R |
| 2,992,577 | 7/1961 | Marxen | 81/57.22 |
| 2,720,803 | 10/1955 | Rice et al. | 81/52.4 R |
| 2,886,155 | 5/1959 | Hadley | 192/142 R |

Primary Examiner—James L. Jones, Jr.
Attorney—Spencer & Kaye

[57] ABSTRACT

An attachment to injection-molding machines for removing threaded cores from pieces molded therein has a motor connected to a hollow spindle so as to rotate the same. The hollow spindle either transmits the torque from the motor to at least one threaded core or to a drive spindle which in turn transmits the torque to a threaded core. The spindle has an outer surface defining a thread section. A stationary switch element is provided for a respective one of a pair of adjustable switching cam means which are arranged on the outer periphery of a scale disc connected to the hollow spindle for rotation therewith. The setting of the cams via the cooperation with the switch element determines the start and finish of a core removal cycle.

8 Claims, 4 Drawing Figures

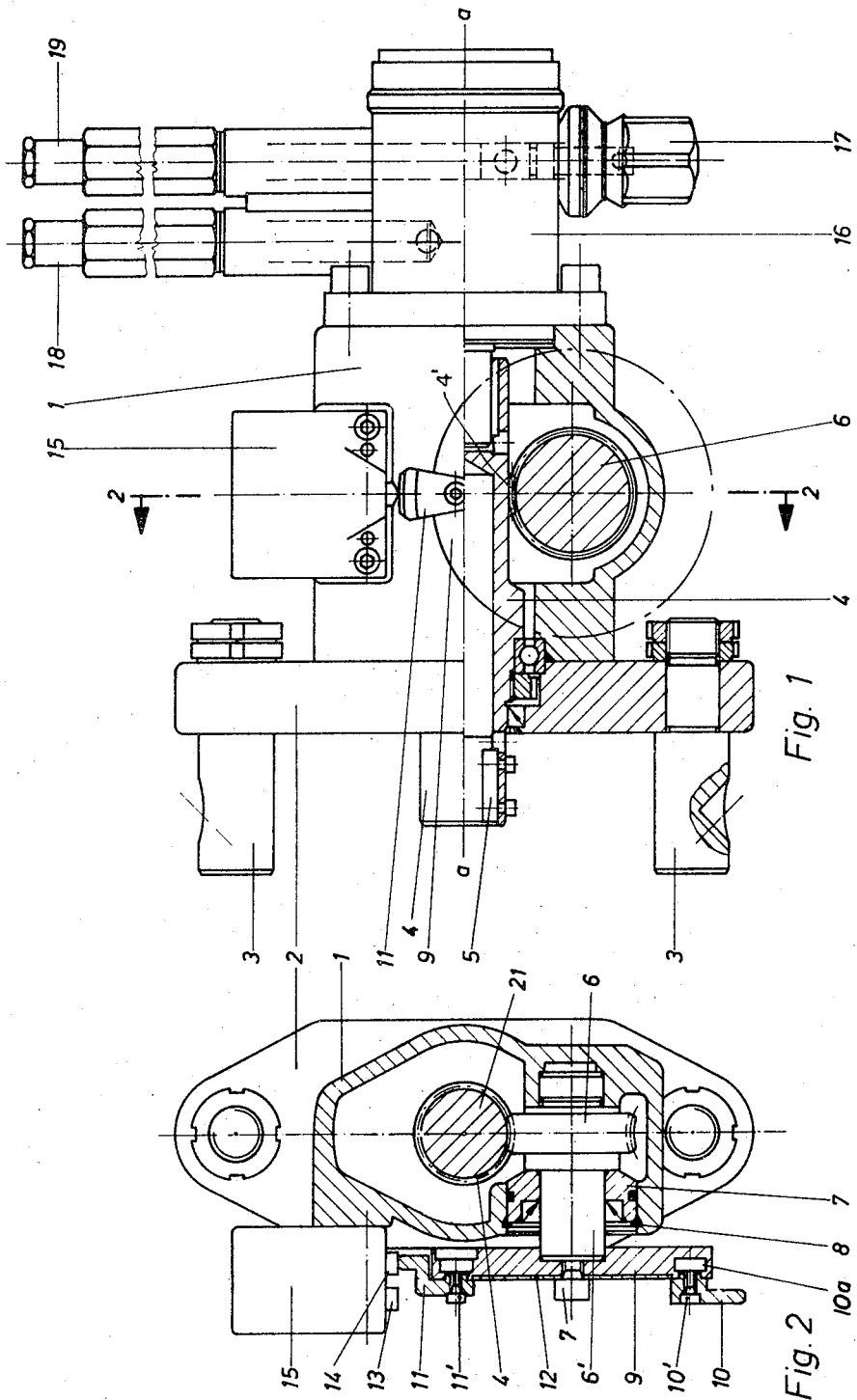

INVENTOR.
Karl Hehl

3,664,212

ATTACHMENT FOR INJECTION-MOLDING MACHINES

BACKGROUND OF THE INVENTION

The present invention relates to an attachment to injection-molding machines for inserting and removing threaded cores from molded pieces.

Molded, or cast, pieces constructed from a synthetic material are often needed as, for example, machine components or as components for instruments and the like. These pieces often must be provided with one or a plurality of threads, which may be either internal or external threads. The internal threads may serve, for example, to hold a threaded plug and make it possible to connect the cast piece with another part. The thread in the cast piece is produced by, for example, inserting a metallic threaded core, or sleeve, into the cavity of the mold before the material is injected into the mold so that the insert cooperates in the formation of the cast piece. This core, or sleeve, is then screwed out of the cast piece formed in the mold upon completion of the injection-molding process.

For reasons of simplicity, only the phrase "threaded core" will be used in the description hereafter, without, however, intending to exclude the use of threaded sleeves.

With the aid of the above-mentioned attachment, the threaded core is inserted into the cavity of the mold before the injection process begins. The axial component of movement of a screwing movement of the threaded core is utilized to perform the insertion and removal. In order that all cast pieces which are produced within one production series will be exactly identical, it is necessary to screw the threaded core into the cavity of the mold with great precision and to then screw it out of the cast piece afterward. High accuracy in dimensions can only be obtained by an exact determination and control of the number of turns and partial turns which must be made in order to bring the threaded core into the mold cavity in its proper position, and to be able to remove it therefrom after the injection-molding process.

A known device of this type is operated, for example, by means of a hydraulic pressure cylinder through a gear rod; the pressure cylinder and gear rod being components of the mold.

SUMMARY OF THE INVENTION

It is an object of the present invention to provide a device for inserting and removing threaded cores that can be used with molds of any desired dimensions as well as with injection-molding machines of different sizes and types, and with which the threaded core can be controlled with an accuracy which has been thus far unobtainable.

This is accomplished according to the present invention by providing an attachment which has a motor driven, hollow spindle as a guide for the threaded core, or as the mount for a drive spindle. The hollow spindle transmits torque from a motor to at least one threaded core, and is provided with an externally threaded section to control an adjustable switching means, such as cams which cooperate with stationary switches. This switching means determines the start and finish of the removal process of the threaded core in dependence on its setting.

An extremely accurate control of the threaded core is accomplished by having the externally threaded section of the hollow spindle drive an indicator disc through a worm gear. The circumference of the indicator disc has two switching elements in the form of switching cams arranged thereon which actuate the stationary switches.

BRIEF DESCRIPTION OF THE DRAWINGS

FIG. 1 is a plan view, partly in cross section, of an attachment according to the present invention.

FIG. 2 is a partially cross-sectional view taken generally along the line 2—2 of FIG. 1.

DESCRIPTION OF THE PREFERRED EMBODIMENTS

Figure 4:
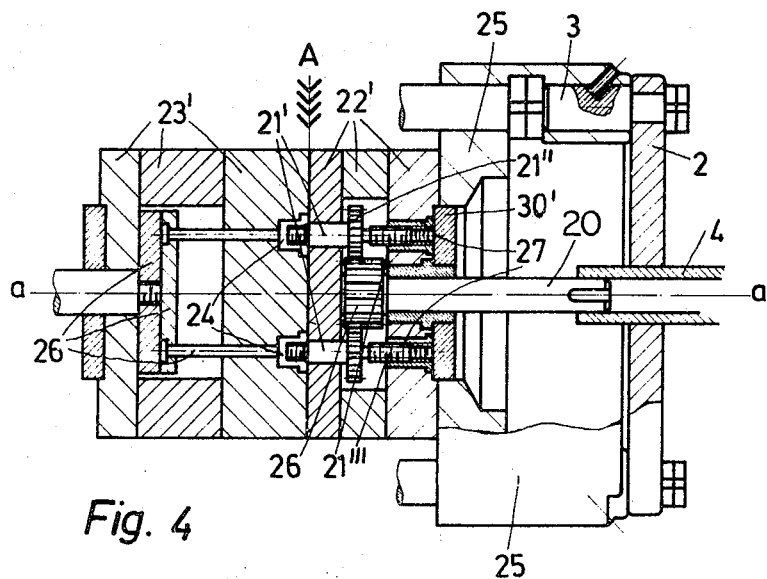
FIG. 4 is a schematic, partial side elevation view, partly in cross section, of another embodiment of an attachment according to the present invention mounted on a clamping unit of an injection-molding machine.
Figure 3:
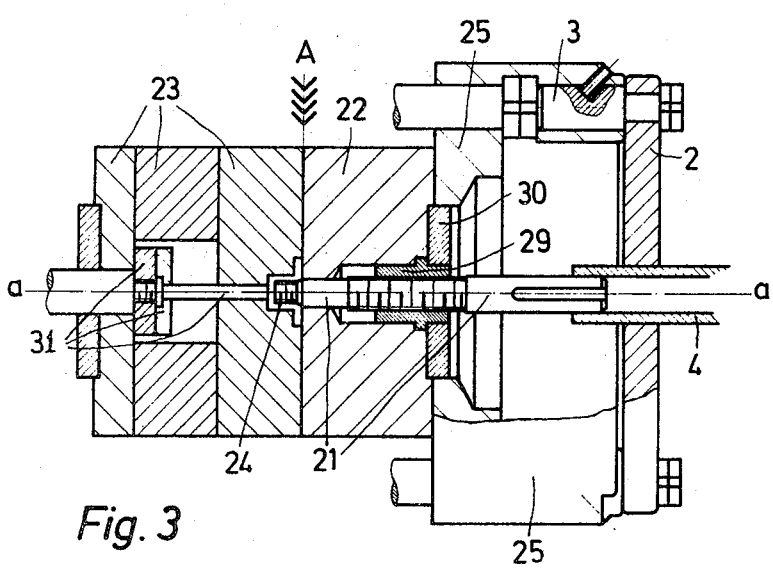
FIG. 3 is a schematic, partial side elevation view, partly in cross section, of one embodiment of an attachment according to the present invention mounted on a clamping unit of an injection-molding machine.

An adapter plate 2 of different predetermined dimensions is selectively and releasably mounted in a known manner, such as by flanges, to a housing 1. At least two linchpins 3 are fastened in a known manner to each plate 2 at a defined mutual spacing. The pins 3 serve to fasten the device in the proper position at the clamping unit of a known injection-molding machine (FIGS. 3 and 4). The operating axis a-a (FIG. 1) of the attachment device may be either transverse or parallel to the separating groove A of the mold (FIGS. 3 and 4). Prerequisite for the proper positioning of the attachment device at the clamping unit of a known injection-molding machine is the selection of an adapter plate 2 having a spacing of pins 3 corresponding to the clamping unit of a known injection-molding machine is the selection of an adapter plate 2 having a spacing of pins 3 corresponding to the corresponding pin holes in the stationary clamping unit 25 (FIGS. 3 and 4). A fluid motor 16 with an inlet and an outlet 18, 19 and a speed control unit 17 is mounted in a known manner to housing 1 opposite plate 2. A hollow spindle 4 is disposed on the drive shaft of the motor 16 and serves either as a guide for the threaded core 21 (FIG. 3) or as a mount for a drive spindle 20 (FIG. 4) which transmits the torque from the motor to, for example, a toothed gear 26 which controls a plurality of threaded cores. The transmission of the torque of motor 16 by threaded sleeve 4' to either a threaded core 21 (FIG. 3) or to the drive spindle 20 (FIG. 4) is assured by a follower 5 (FIG. 1).

In the embodiment of FIG. 3, a threaded core 21 is directly brought through the hollow spindle 4, so that the axial component of movement of this threaded core is produced by means of a screw threaded guide means 29 or by the screw threads formed on the piece cast in space 24 which encloses the core. The guide means 29 is centered in the mold half 22 by means of a centering ring 30. The other mold half 23 is provided with an ejection device 31.

In the embodiment of FIG. 4, the drive spindle 20 is controlled by the hollow spindle 4. This drive spindle 20 is axially stationary. Its free end forms a gear 26 which drives at least two radially disposed threaded cores, each having a stationary screw threaded guide member.

Gears 21'' of the threaded cores 21' mesh with gear 26. The threaded cores 21 are each guided by their respective rearward shafts 21''', which are provided with an external screw thread, in a screw thread of a stationary threaded sleeve 27. The threaded sleeves 27 are centered in the mold half 22' by means of centering ring 30'. The other mold half 23' is provided with an injection device 26 which ejects the finished cast pieces from the mold.

The hollow spindle 4, which in the embodiment of FIGS. 1 and 2 is provided in the form of a worm sleeve, forms a worm drive with a worm gear 6 having a journal pin 6'. A scale disc 12 is mounted on bearing pin 6' for movement therewith. Two switching cams 10, 11 are adjustably mounted along the periphery of the disc 12 in a T-shaped annular groove 10a. As can be seen in FIG. 2, the switching cam 11 is angled off so as to lie in a different plane than cam 10. The cams cooperate with switching elements 13, 14 of stationary, known microswitches which are accommodated in a housing 15. The microswitches are connected in a known manner to control motor 16. The worm gear 6 rotates in an oil bath provided in housing 1. The exit opening for bearing pin 6' is covered in housing 1 by a cover 7. The cover 7 is secured to the housing 1 by means of, for example, a Seeger ring (not shown). The switching cams 10, 11 may be clamped to the scale disc 12 in the desired position by means of, for example, clamping screws 10' and 11'.

The apparatus operates as follows:

First the attachment device is adapted to the size and/or type of the clamping unit of a particular injection-molding machine by the selection of a suitable adapter plate 2 from an available assortment of such plates. The selected plate 2 is fastened to housing 1. Then the device is fastened to the clamping unit 25 with the aid of the pins 3 on the adapter plate 2; these pins 3 engaging into corresponding bores in the clamping unit 25. This fastening may occur in such a manner that the operating axis $a-a$ lies either transverse or parallel to the separating groove A of the mold, as stated above. Then the switching cams 10, 11 are set according to either the desired number of turns or the desired last partial turn of the threaded core. Switching cam 10, for example 10, for example, determines the finish of the core removal cycle. Switching cam 11, for example, determines the start of the removal cycle, or the end of the screwing-in of a threaded core.

To set the switching cams, one proceeds as follows:

The fluid motor 16 is permitted to run until the particular threaded core has been screwed out by the desired number of turns or to the desired last partial turn. The associated switching cam 10 is then set to actuate switching element 13 in this position, and is mounted in a known manner in the T-shaped groove of the scale disc 12. The fluid motor 16 is now permitted to run in the opposite direction until the threaded core extends into the mold by either the desired number of turns or to the desired last partial turn. Then the other switching cam 11 is then set to actuate the associated switching element 14 of the associated microswitch at this position, and is clamped in a known manner in this position in the T-shaped groove of the scale. A known vernier device (not shown in detail) is attached to each switching cam to permit accurate reproduction of the once selected setting by means of the scale indications obtained.

The device according to the present invention is particularly suited for producing cast pieces having one or a plurality of internal threads, where the dimensions must be most accurately reproduced, because the determination and resetting of the scale values determining the desired number of turns, or the last partial turn, or the reproduction of the turns themselves based on the worm gear 6 and the vernier device attached to the switching cams is accomplished with an accuracy which has previously been unobtainable.

It will be understood that the above description of the present invention is susceptible to various modifications, changes and adaptations, and the same are intended to be comprehended within the meaning and range of equivalents of the appended claims.

I claim:

1. A device to be attached to an injection-molding machine for removing threaded cores from pieces molded therein, comprising, in combination:
   a. motor means for emitting a torque to perform a core removal cycle;
   b. hollow spindle means arranged to be rotatably driven by said motor means and for transmitting the torque emitted by said motor means to at least one threaded core;
   c. at least one stationary switch for controlling said motor means; and
   d. adjustable switching cam means connected to said spindle means and arranged to be controlled thereby and to cooperate with said stationary switch for determining, according to their setting, the start and finish of a core removal cycle.

2. A device as defined in claim 1, wherein said spindle means has an outer surface defining a thread section which is connected to said cam means.

3. A device as defined in claim 2, wherein said hollow spindle means serves as a guide for the at least one threaded core.

4. A device as defined in claim 3, further including a worm gear, a scale disc mounted for rotation and connected to said worm gear, and wherein said adjustable switching cam means is a pair of switching cams which are adjustably mounted at the periphery of said scale disc.

5. A device as defined in claim 4, further including a housing having a pair of opposite sides for mounting said hollow spindle means, an adaptor plate removably mounted to one of said pair of opposite sides, and a fluid motor removably mounted to the other of said pair of opposite sides.

6. A device as defined in claim 5, wherein said worm gear has a journal pin arranged perpendicular to said hollow spindle means and extending beyond the side of said housing on which said adaptor plate is mounted, and wherein said stationary switch is a microswitch arranged radially with respect to said scale disc.

7. A device as defined in claim 6, wherein said stationary switch is arranged in a plane which passes through the axis of said worm gear.

8. A device as defined in claim 2, further including a drive spindle mounted on said hollow spindle means and operable to impart torque to the at least one threaded core.

* * * * *